United States Patent [19]
Smith

[11] 4,397,428
[45] Aug. 9, 1983

[54] TAPE DRIVE HAVING IMPROVED REEL HUB

[75] Inventor: Paul F. Smith, Broomfield, Colo.

[73] Assignee: Storage Technology Corporation, Louisville, Colo.

[21] Appl. No.: 237,385

[22] Filed: Feb. 23, 1981

[51] Int. Cl.³ .................. G03B 1/04; G11B 15/32; G11B 23/04; F01B 19/00

[52] U.S. Cl. ................. 242/201; 242/68.1; 92/48

[58] Field of Search ............ 242/68.1–68.3, 242/197–201, 72 B, 72.1, 46.2, 46.4; 105/11; 254/93 R, 93 H; 279/2 R, 2 A; 269/48.1; 74/DIG. 1, 505.1 H; 92/48–50

[56] References Cited

U.S. PATENT DOCUMENTS

| 2,467,883 | 4/1949 | Edwards, Jr. | 92/48 |
| 2,546,596 | 3/1951 | Haines, Sr. | 92/48 |
| 3,310,253 | 3/1967 | Rayfield et al. | 242/68.3 |
| 3,708,136 | 1/1973 | Cope et al. | 242/68.3 |
| 3,825,203 | 7/1974 | Kjos et al. | 242/68.3 |
| 3,923,268 | 12/1975 | Urynowicz | 242/68.3 |
| 4,279,386 | 7/1981 | Lobo et al. | 242/68.3 |

Primary Examiner—Leonard D. Christian
Attorney, Agent, or Firm—Woodcock, Washburn, Kurtz, Mackiewicz & Norris

[57] ABSTRACT

A magnetic tape drive having an improved actuator for an automatic hub for holding a reel of tape disclosed in which the improved actuator features a stack of pneumatic bladders disposed between congruent reaction surfaces which are rigidly connected to one another so that the total force exerted by the bladders is multiplied by the number of bladders to yield an increased holding force without concomitant increase in the actuator package size.

3 Claims, 7 Drawing Figures

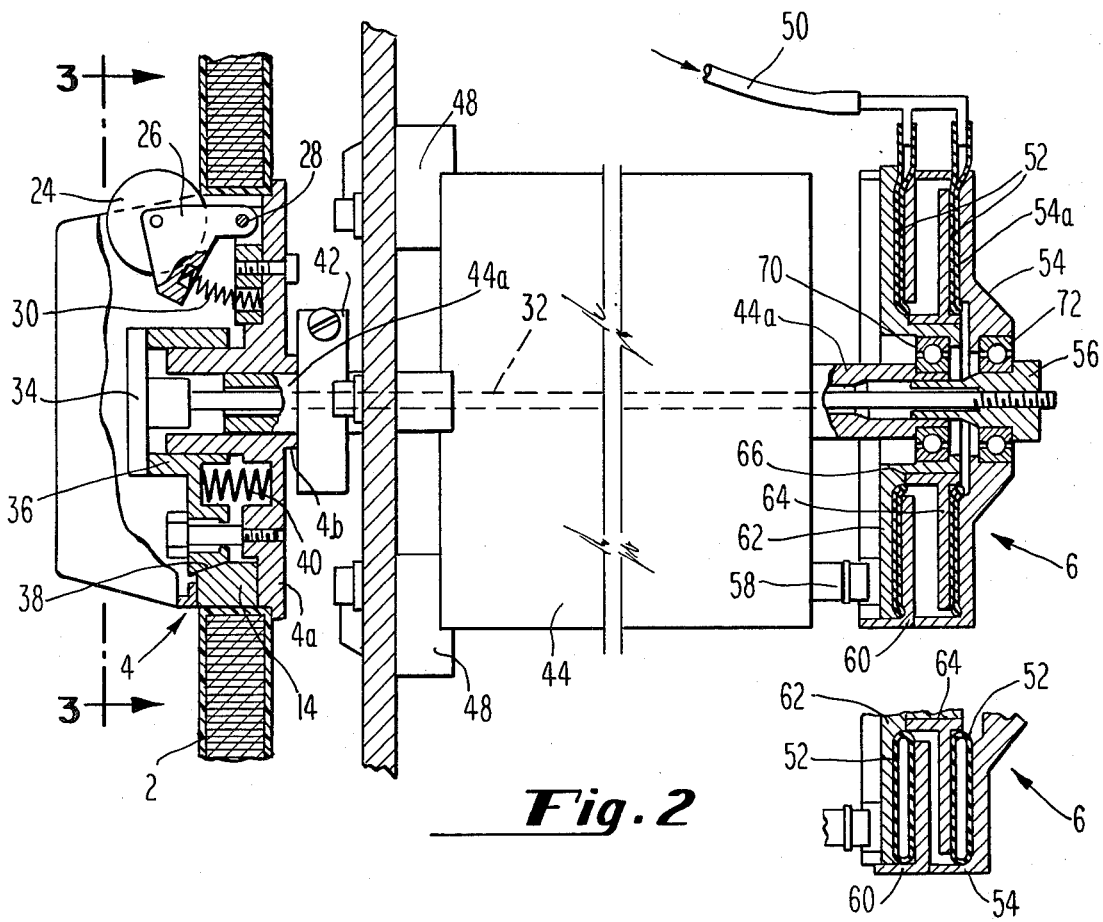
Fig. 2
Fig. 2a
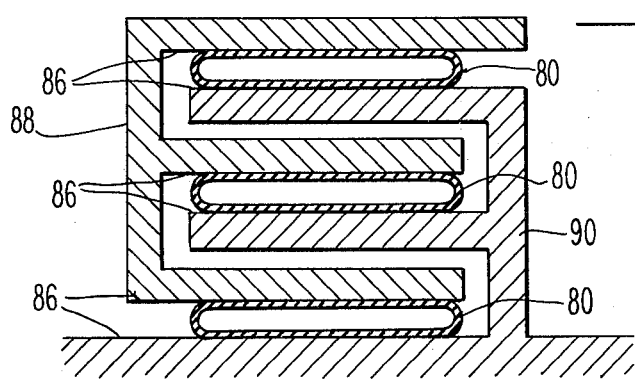
Fig. 4

TAPE DRIVE HAVING IMPROVED REEL HUB

FIELD OF THE INVENTION

This invention relates to the field of magnetic tape drives. More particularly, the invention relates to an improved actuator for operating an automatic hub which holds a reel of tape in position on the tape drive.

BACKGROUND OF THE INVENTION

Magnetic tape drives for unreeling a long length of magnetic tape from a "file reel", directing it past a read/write head and winding it upon a "machine reel" are well known. Typically, in data storage applications, the tape must be capable of being accelerated from a stop to a relatively high speed very quickly, and decelerated at a like rate by motors driving the file and machine reels. This requires a substantially non-slipping connection between the hub and each of the reels. In the case of the machine reel, which may be mounted on the tape drive more or less permanently, this is easy to achieve. However, in the case of the file reel, which must be adapted to be readily and speedily removed and replaced with a different file reel, the art has as yet not provided the ultimate hub design. While non-slip hubs have been developed, their operation has not been as easy for the operator as would be desired. Typically, they have involved heavily spring-loaded over-center catches which exert frictional pressure against the inner diameter of the reel of magnetic tape. Such hubs are hard for an operator to operate as they require him or her to physically overcome the spring force. Other designs have involved pneumatic or solenoid actuators mounted behind the motor and transmitting force to the hub through the center of the motor shaft, this being hollow, but the designs in the prior art have been unduly complex and, more significantly, bulky. The overall aim of the tape drive art is to make the drive smaller, lighter and simpler and there exists therefore a substantial need for a less bulky, lighter and preferably more readily manufactured actuator for a file reel hub.

It will be appreciated by those skilled in the art that there are numerous means for exerting a force sufficient to hold a file reel with respect to a hub. Electromagnetic solenoids and compressed air actuated devices suggest themselves as typically magnetic tape drives already contain circuitry and e.g., piping suitable for control of such devices. However, utilization of an electromagnetic solenoid strong enough to exert a sufficient holding force would necessitate that the solenoid be very heavy and expensive and draw excessive amounts of current. Use of a pneumatic actuator is therefore preferable. However, available pneumatic actuators clearly involve a tradeoff between size and pressure; that is, the area of the working surface exposed to the pressurized fluid or gas varies with respect to the pressure applied. If the pressure is raised, the actuating force is increased for a given size reaction surface, but this is undesirable as high pressure means concomitantly more attention must be paid to leaky connections, the choice of the tubing used, and the like; while simply increasing the area of the reaction surface results in the overall actuator becoming more bulky, which as discussed above is highly undesirable in the magnetic tape drive application. Therefore, the need exists in the art for an improved actuator, preferably of a type which exerts a substantial force upon application of relatively low pressure fluid or gas, but which is not bulky. Moreover, it would clearly be desirable that the actuator be readily manufacturable, simple of operation and durable in service.

OBJECTS OF THE INVENTION

It is therefore an object of the invention to provide an improved actuator for the file reel hub of a magnetic tape drive system.

A further object of the invention is to provide an improved pneumatic actuator for use where bulk of the actuator and low pressure of the actuating fluid or gas are important.

Still a further object of the invention is to provide an improved pneumatic actuator which is simple and inexpensive as compared with those in the prior art, yet which offers improved performance in a smaller package.

An ultimate object of the invention is to provide an improved magnetic tape drive system.

SUMMARY OF THE INVENTION

The above objects of the invention and needs of the art are satisfied by the present invention which comprises an improved pneumatic actuator specifically for use in magnetic tape drives, but having far wider application. A plurality of expansible containers for pressurized fluid or gas, such as bladders, are interposed between pairs of parallel reaction surfaces. Upon application of pressurized fluid or gas such as compressed air to the bladders, the reaction surfaces are relatively moved; these may be connected to members operating the associated apparatus. The improvement lies in connecting corresponding ones of each of the pairs of the reaction surfaces rigidly to one another so that upon supply of compressed air to the bladders, the overall force exerted is proportional to the number of pairs of reaction surfaces involved, while the overall travel of the actuator is limited to that undergone by each individual pair. By stacking the opposing surfaces one behind the other, the force exerted can be multiplied while the overall package size grows only slightly.

BRIEF DESCRIPTION OF THE DRAWINGS

The invention will be better understood if reference is made to the accompanying drawings in which:

FIG. 2 represents a cross-sectional view of the file reel mounting hub together with the drive motor and the actuator in the rest position, taken along the line 2—2 of FIG. 1;

FIG. 2a represents a section of the view of FIG. 2, with pressure having been applied;

FIG. 4 shows a schematic view exemplifying the principle of operation of the improved actuator of the invention;

DESCRIPTION OF THE PREFERRED EMBODIMENTS

Figure 1:
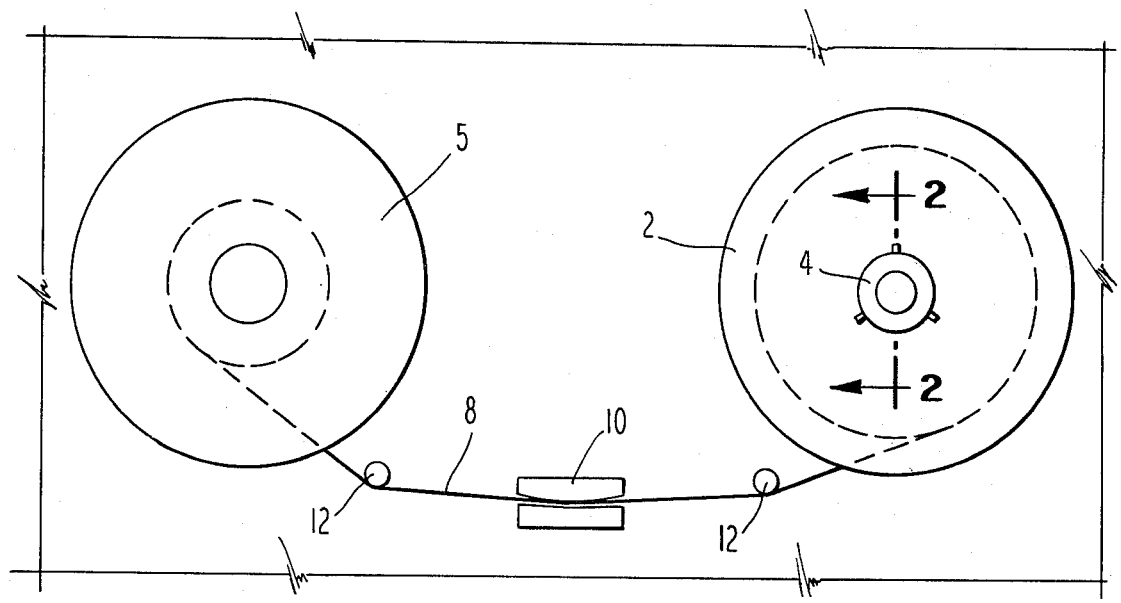
FIG. 1 represents an overall schematic view of a magnetic tape drive featuring the improved hub of the invention.

Referring now to FIG. 1, an overall schematic view of a magnetic tape drive is shown. It comprises a "file" or supply reel 2 detachably mounted on a hub according to the invention 4 and a "machine" or take up reel 5 typically permanently mounted. Interconnecting the two reels is a web of magnetic tape 8 which passes by a read/write head 10; the tape path may additionally comprise guide means 12, as well known in the art. The particular improvement in magnetic tape drives to which this application relates inheres in the actuator used to secure the reel 2 to the hub 4.

Figure 3:
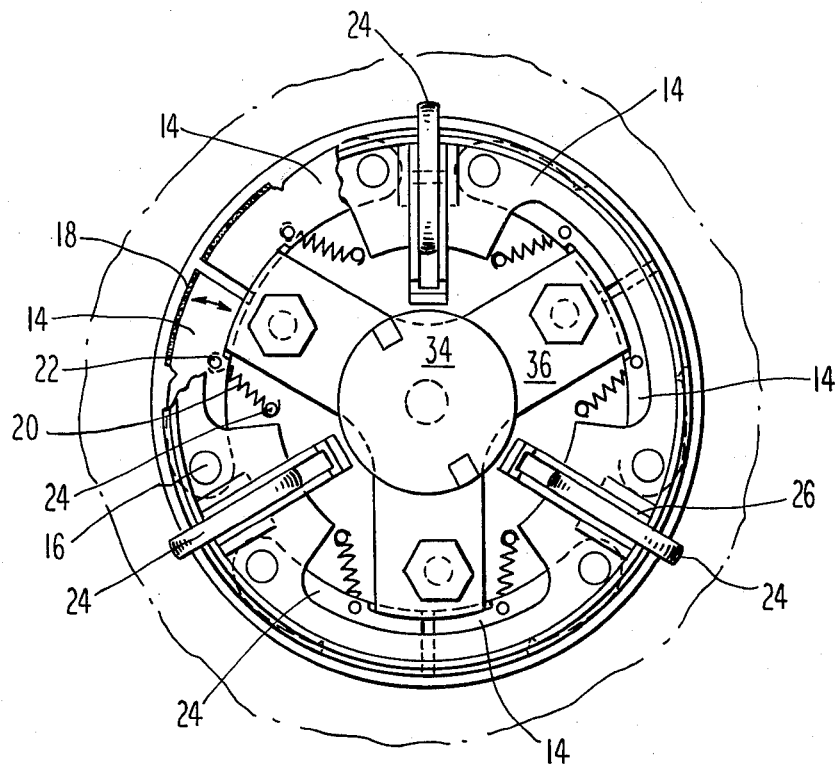
FIG. 3 represents a detailed end view of the file reel hub.

Reference is now made to FIGS. 2 and 3 to show the structure of the hub and of the actuator. As shown in the end view of the hub 4 shown in FIG. 3, in the preferred embodiment the hub is a circular device adapted to fit within a correspondingly circular opening in a reel of tape 2 and may comprise six shoes 14 which are pivotable about pivots 16 in directions indicated by an arrow marked on one of the shoes 14. When actuated to grip the reel of tape, the shoes 14 are pivoted slightly outwardly about pins 16 and pads of a friction material such as for example, a silicone rubber 18 are forced into firm, non-slipping engagement with the inner circumference of the reel of tape 2. The shoes 14 may be biased inwardly by springs 20 mounted between conventional roll pins 22 and 24, so that when the pressure on the hub is released, the shoes are positively pulled away from the inner circumference of the reel of tape 2, allowing it to be removed and replaced by, for example, another reel of tape.

The reel of tape 2 may be retained on the hub 4 prior to actuation of the shoes 14 by three retainers 24. These retainers may comprise generally circular disks adapted to pivot on arms 26 which themselves are mounted on pivot pins 28. Arms 26 are biased outwardly by springs 30 and located such that they are rotated inwardly about pivot pins 28 upon an operator putting a reel of tape on the hub 4; thereafter, the spring bias ensures that the reel of tape is held properly with respect to the shoes 14 prior to actuation thereof.

FIG. 2 shows details of the actuator 6, which provides an axial force on a rod 32 extending through the center of the reel motor 44, the actuator 6 and the hub 4. In the particular hub embodiment shown, the rod 32 is connected to an end piece 34 which transfers this force to an axially movable member 36. This member 36 is formed with inclined surfaces 38 on its outermost extremities which bear against correspondingly shaped surfaces on the shoes 14 so that when the rod 32 pulls the member 36 axially toward the reel motor 44, the shoes 14 are forced outwardly causing the friction pads 18 to be urged into firm engagement with the inner surface of the reel of tape 2. Upon release of tension in the rod 32, springs 40 insure that the triangular member 36 is moved axially outwardly, with respect to the reel motor 44, thus allowing the shoes 14 to pivot inwardly under the bias of springs 20 and releasing the reel of tape 2, allowing it to be removed.

As shown, the chassis 4a of the hub 4 may be formed integrally with a stem portion 4b. This may be clamped by means of a clamp 42 to the motor shaft 44a. Motor 44 may be clamped to the face plate of the tape drive 46 as indicated generally at 48.

Mounted on the rear of the motor shaft 44a is the actuator 6. The actuator 6 is operated by compressed air supplied through a tube indicated at 50 to two or more bladders 52. The bladders 52 may be integrally molded of a resilient material to assume a generally toroidal shape when expanded. Upon supply of the bladders 52 with pressurized fluid or gas such as compressed air, a rearward cover portion 54 of the actuator 6 exerts an axial force on a member 56 threaded to the rod 32, which accordingly exerts axial force on the member 36, causing the shoes 14 to be forced into non-slipping engagement with the inner circumference of the reel of tape 2.

Figure 5:
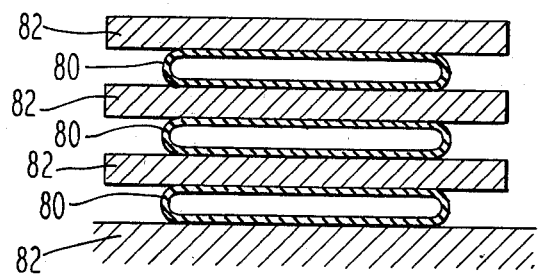
FIG. 5 shows a schematic view of an unsatisfactory actuator having insufficient output force.
Figure 6:
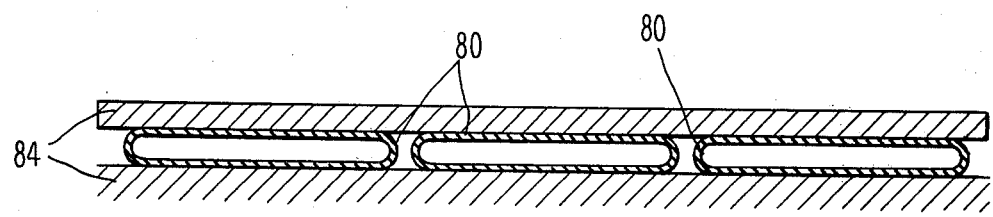
FIG. 6 shows a schematic view of an unsatisfactory method of obtaining additional force from a pneumatic actuator without increasing the fluid or gas pressure.

Reference will now be made to FIGS. 4, 5 and 6 for discussion of the principles of operation of the actuator of the invention; the description of the detailed embodiment of the actuator 6 will be completed thereafter.

As discussed above, it is desirable that the actuator of the invention operate in response to supply of low pressure compressed air and that it not be too bulky, yet that it exert a strong enough force on the reel so that the reel does not slip with respect to the hub. Given an actuator of a specific diameter, for example, one might be inclined to multiply the bladders and the surfaces against which the bladders act in series as shown in FIG. 5; three identical bladders 80 are placed between reaction surfaces 82. Upon actuation the bladders 80 would be expanded as shown, and the reaction surfaces 82 all be forced apart. However, those skilled in the art will recognize that this expedient would merely multiply the overall travel undergone by the outermost reaction surfaces 82 with respect to one another upon inflation of the bladders 80, and that the net force exerted therebetween is equal only to that exerted by a single one of the bladders.

FIG. 6 shows a method by which bladders can be multiplied to yield an increase in the force exerted; the bladders 80 are placed in parallel. The total travel of one reaction surface 84 with respect to the other is limited to that provided by a single bladder 80, but the net force is multiplied by the number of bladders 80. However, it will be appreciated that the planar extent of the reaction surfaces 84 is likewise multiplied by the number of bladders and this, therefore, involves a substantial and undesirable growth in size of the overall actuator.

In the magnetic tape drive environment with respect to which the present invention was made, a single actuator of a generally circular outline sized to fit behind a tape drive motor is simply inadequate to provide enough force to hold the reel steady with respect to the hub unless inordinantly high air pressures are used. This difficulty is overcome by the improved actuator according to the invention. FIG. 4 shows its principle of operation: plural bladders 80 are interposed between stacked pairs of reaction surfaces 86, while the corresponding ones of the reaction surfaces 86 are rigidly coupled to one another by connecting members shown at 88 and 90. Thus the overall travel undergone by one rigid connecting member 88 with respect to the other member 90 is equal to that generated by a single bladder 80, and the force is multiplied by the number of bladders 80, as if the bladders were "in parallel", while the overall dimensions of the actuator are approximately equal to a stack of single bladder actuators having increased travel but limited actuating force, as if "in series", thus combining the best features of both.

Referring to FIG. 2, the actuator according to the invention exploits the construction shown in FIG. 4 by its interposition of plural bladders 52 between rigidly connected corresponding reaction surfaces. The back cover 54 of the actuator 6 forms one reaction surface which is rigidly connected to a second reaction surface 60 at the outer periphery of a generally circular actuator 6. These may be termed "corresponding ones of pairs of reaction surfaces." The "other ones of the pairs of reaction surfaces" are shown at 62 and 64 and are rigidly connected to each other generally at the inner circumference of the circular actuator at 66. Therefore, upon admission of compressed air to the bladders 52, the individual pairs of reaction surfaces 60 and 62, and 54 and 64, respectively are spread apart, while the "corresponding ones" of each pair 54 and 60 and 62 and 64, respectively do not move relative to one another. FIG. 2a provides a partial view of the expanded actuator to make the relative movement clear. In this way, the total force is equal to the force exerted by each bladder multiplied by the number of bladders (in this case 2), while the travel of the outermost actuator portions, here 54 and 62, and hence the travel provided to the rod 32, is equal to that of a single bladder 52.

The operation of the actuator of the invention will be made more clear by reference to FIG. 2a, which shows a portion of the actuator after expansion of bladders 52. It will be appreciated that while corresponding ones of the pairs of reaction surfaces such as 54 and 60 are still in contact at the outer periphery of the device, and the other ones 62 and 64 of the pairs of reaction surfaces are still in contact with one another at the inner circumference of the device, the individual ones of each pair have each been spaced apart from one another by the same distance. Stated differently, the rigid connection between corresponding ones of each pair of reaction surfaces allows each bladder to exert force directly on the apparatus to be operated, rather than via another bladder, as in the arrangement of FIG. 5. The force exerted by the bladders is thus multiplied by their number, while the distance the outermost reaction surface 54 travels with respect to the innermost 62 (to which the relatively moving rod 32 and motor shaft 44a are mounted, respectively) is not multiplied. Moreover, the overall size of the actuator package 6 is only very slightly thickened and it does not grow at all in circumference, thus enabling it to be neatly packaged behind a tape drive motor of similar size, as shown in FIG. 2.

Other details of the invention will readily be apparent to those skilled in the art. For example, the threaded member 56 transmitting the force exerted by the bladders 52 to the rod 32 to actuate the hub 4 must be mounted in bearings with respect to the back cover of the device 54 so that the actuator device does not turn with the motor shaft 44a, which would require compressed air hose 50 to be a rotatable coupling. Similarly, bearings 70 carry the back portion of the actuator 6 on the motor shaft. The actuator 6 is prevented from rotation by a key means 58 while permitting the motor shaft 44a, hub 4, reel 2 and rod 32 to turn with respect to the motor 44 and actuator 6. It will be appreciated by those skilled in the art that while the bearings 70 and 72 might desirably be thrust bearings so as to better accommodate the loading placed thereon by operation of the actuator 6 of the invention, no axial thrust force is exerted on the motor bearings, the thrust being entirely between the rod 32 and the motor shaft 44a, thus not requiring a specially designed motor.

It will also be appreciated that the principle of the invention has application to devices other than actuators; for example, the sensitivity of an instrument for the measurement of the force exerted between relatively movable members using expansible bladders to exert pressure on a gauge could be improved with no size penalty by multiplication of the bladders according to the invention.

It will similarly be appreciated by those skilled in the art that while a preferred embodiment of the invention has been described in detail above, this should not be taken as a limitation on the scope of the invention but merely as exemplary thereof. The scope of the invention is accordingly defined by the following claims.

I claim:

1. In a magnetic tape drive having a first shaft for carrying a first reel of tape, a second shaft for carrying a second reel to receive said tape, a magnetic read/write head, means for defining a tape path interconnecting said first reel, said read/write head and said second reel, hub means for releasably affixing said first reel to said first shaft, and pneumatic actuator means mounted on said first shaft and operatively connected to said hub means for operating said hub means, said actuator means comprising opposed pairs of rigid reaction surfaces and two or more inflatable bladders disposed between said opposed pairs of rigid reaction surfaces, corresponding ones of each of said pairs of surfaces being in contact with one another, whereby upon inflation of said bladders the two reaction surfaces comprising each of said pairs are moved relative to one another, while corresponding ones of each of said pairs of surfaces do not move relative to one another.

2. The drive of claim 1 in which said reaction surfaces are generally circular and said bladders when inflated are substantially toroidal in shape.

3. The drive of claim 2 wherein first corresponding ones of each of said pairs of surfaces are in contact along the outer circumference of said circular reaction surfaces and the other ones of said pairs of surfaces are in contact with one another along contact lines disposed generally centrally within said circular reaction surfaces.

* * * * *